Dec. 20, 1927.
W. G. PRICE
1,653,372
VEHICLE WHEEL
Filed Aug. 13, 1924
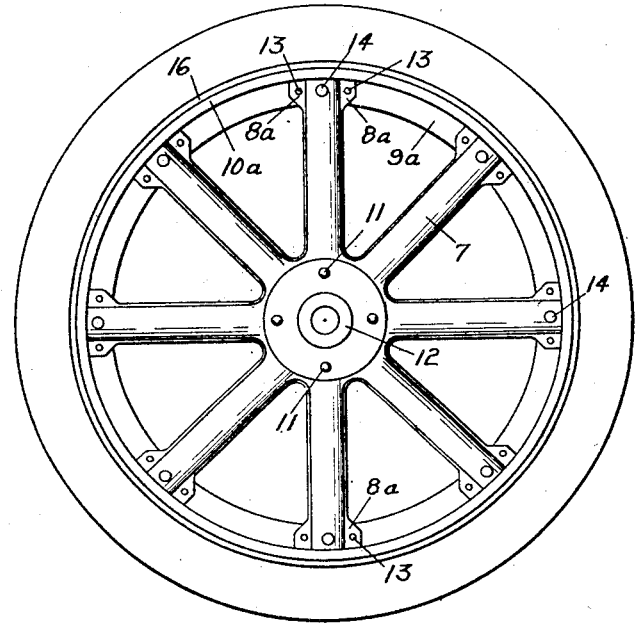
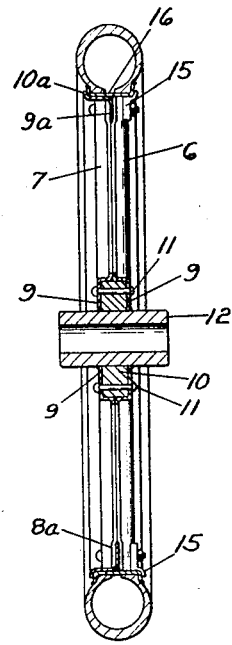
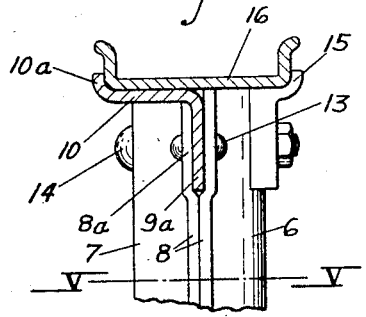
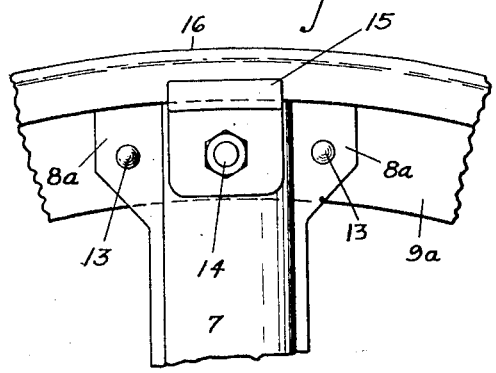
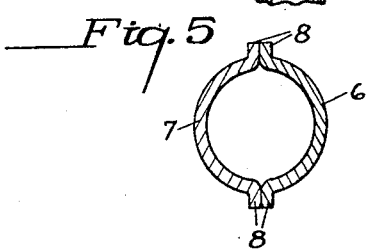
INVENTOR.
William G. Price
BY Kay, Totten & Martin
ATTORNEYS.

Patented Dec. 20, 1927.

1,653,372

UNITED STATES PATENT OFFICE.

WILLIAM G. PRICE, OF YAKIMA, WASHINGTON.

VEHICLE WHEEL.

Application filed August 13, 1924. Serial No. 731,841.

My invention relates to vehicle wheels, and particularly to wheels more especially designed for employment with rubber tires.

One object of my invention is to provide a wheel composed principally of pressed metal parts, of simple construction, and effective and convenient in its operation and assemblage.

Another object of my invention is to simplify and improve generally the structure of vehicle wheels.

One form which my invention may take is shown in the accompanying drawing, wherein Fig. 1 is a view showing a completed wheel embodying my invention; Fig. 2 is a sectional view of the wheel of Fig. 1; Fig. 3 is a view, on an enlarged scale, of a portion of the wheel of Fig. 2; Fig. 4 is a view, on an enlarged scale, of a portion of the wheel of Fig. 1, and Fig. 5 is a view taken on the line 5—5 of Fig. 3.

The wheel is composed principally of two pressed metal parts, 6 and 7, each formed into half spoke portions, having abutting flanges 8, and widened hub portions 9.

The hub portions or flanges 9 are secured to a filler member 10 by rivets 11, and the width or thickness of the spokes is substantially the same as the thickness of the usual wooden spokes, so that no change is required in the hub 12.

At their outer ends, the wing portions 8 are extended, as indicated at 8ª, and are riveted to the inner flange portion 9ª of an annular rim member 10 by rivets 13.

The rim member 10 is further secured to the spokes by means of bolts 14, which pass therethrough. The bolts 14 serve to also retain clips 15 in position.

The rim member 10, at its intermediate portion, is disposed across the outer end of the spoke portion 7, which is slightly shorter than the spoke portion 6, thus presenting a substantially flush surface as between the outer end of the spoke portion 6 and the outer side of the rim member 10. This provides a firm seat for the rim 16, which may be of the usual form. The rim 16 is retained in place by the upturned edge 10ª of the member 10, and by the clip members 15.

The clip members 15 are readily detachable, to permit removal of the rim 16.

The half spoke portions, during the formation thereof, are sprung slightly inward, so that when the halves of the body of the wheel are brought together and the rivets 11 and 13 are applied, the edges at points between the rivets 11 and 13, are forced into tight engagement, so that there is no looseness, as between the two halves. Further the adjacent edges of the flanges 8 may be coated, as with paint, to seal against the entrance of moisture to the interior of the wheel.

I claim as my invention:

1. A pressed metal wheel, composed of similar half-sections, each including a hub portion and spoke members formed integrally therewith, and bent to tubular form, one half-section having its spoke members of shorter length than those of the other half-section, a rim member disposed circumferentially of the wheel and seated against said short-spoke members, a rim adapted to seat upon the outer ends of said second spoke members and the rim member respectively, and means for holding said rim member in position.

2. A pressed metal wheel, composed of half-sections, each provided with spoke members, the spoke members of one section being shorter than those of the other section, a seat member on the outer ends of said shorter spoke members, means for securing said half sections to said seat member, and means for supporting a tire upon the said seat member and outer ends of the longer spoke members.

3. A wheel composed of half sections having spoke members, and adapted to be secured together, the outer ends of one set of spoke members terminating short of the ends of the co-operating spoke members, a rim supporting member seating against said shorter set of spoke members and having a radially extending flange at its outer edge, a rim seating against the said rim supporting member and the outer ends of the longer spoke members, and means for clamping said rim in position against the said radial flange, to prevent movement thereof axially of the wheel.

4. A wheel comprising half-portions of sheet metal each having spoke members formed therein of substantially semicircular form, the spoke members of one half-portion extending radially a distance farther than the spoke members of the other half-portion, an annular rim member having a radially disposed flange secured between the outer ends of said spoke members and a transversely extending flange overlying the ends of the shorter spoke members, and means for holding a rim in position against the said transversely extending flange and the outer ends of the longer spoke members.

5. A wheel comprising half-portions of sheet metal each having spoke members formed therein of substantially semicircular form, the spoke members of one half-portion extending radially a distance farther than the spoke members of the other half-portion, an annular rim member having a radially disposed flange secured between the outer ends of said spoke members and a transversely extending flange overlying the ends of the shorter spoke members, and means for holding a rim in position against the said transversely extending flange and the outer ends of the longer spoke members, the said means comprising a clip having a seating surface disposed flush with the outer end of the longer spoke members and provided with a flange extending radially beyond said seating surface.

6. A wheel comprising half portions of sheet metal each having spoke members formed therein of substantially semicircular form, each spoke member having oppositely extending flange portions adapted to seat against corresponding flange portions of an adjacent spoke member, a rim member fastened between the outer ends of said spoke members, and means for securing said spoke members together, the flange portions of each spoke member being sprung toward its companion member, so as to effect a snug engagement of the members when drawn together.

In testimony whereof I, the said WILLIAM G. PRICE, have hereunto set my hand.

WILLIAM G. PRICE.